United States Patent
A et al.

(10) Patent No.: US 11,513,720 B1
(45) Date of Patent: Nov. 29, 2022

(54) DATA STORAGE DEVICE HAVING PREDICTIVE ANALYTICS

(71) Applicant: Western Digital Technologies, Inc., San Jose, CA (US)

(72) Inventors: Shaheed Nehal A, Bangalore (IN); Lovish Singla, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/345,877

(22) Filed: Jun. 11, 2021

(51) Int. Cl.
    *G06F 3/06*     (2006.01)
    *G06N 3/04*     (2006.01)
    *G06F 12/02*     (2006.01)

(52) U.S. Cl.
    CPC .......... *G06F 3/0652* (2013.01); *G06F 3/064* (2013.01); *G06F 3/0604* (2013.01); *G06F 3/0659* (2013.01); *G06F 3/0679* (2013.01); *G06F 12/0253* (2013.01); *G06N 3/0454* (2013.01)

(58) Field of Classification Search
None
See application file for complete search history.

(56) References Cited

U.S. PATENT DOCUMENTS

| | | | | |
|---|---|---|---|---|
| 7,610,437 | B2 * | 10/2009 | Sinclair | G06F 3/0652 711/104 |
| 7,984,084 | B2 * | 7/2011 | Sinclair | G06F 16/1847 707/818 |
| 8,285,918 | B2 * | 10/2012 | Maheshwari | G06F 12/0891 711/159 |
| 8,443,263 | B2 * | 5/2013 | Selinger | G06F 11/1068 714/768 |
| 8,873,284 | B2 * | 10/2014 | Sinclair | G06F 12/0246 365/185.11 |
| 8,892,813 | B2 | 11/2014 | Kannappan et al. | |
| 9,223,693 | B2 * | 12/2015 | Sinclair | G06F 12/0246 |
| 9,336,133 | B2 * | 5/2016 | Sinclair | G06F 12/0246 |
| 9,348,746 | B2 * | 5/2016 | Sinclair | G06F 12/0246 |
| 9,465,731 | B2 * | 10/2016 | Sinclair | G06F 3/0688 |
| 9,734,050 | B2 * | 8/2017 | Sinclair | G06F 12/0253 |

(Continued)

OTHER PUBLICATIONS

Pedro Hernandez, "SLC vs MLC vs TLC NAND Flash", Jun. 29, 2018, pp. 1-4, https://www.enterprisestorageforum.com/hardware/slc-vs-mlc-vs-tlc-nand-flash/ (Year: 2018).*

*Primary Examiner* — Christopher D Birkhimer
(74) *Attorney, Agent, or Firm* — Patterson & Sheridan, LLP; Steven H. VerSteeg

(57) ABSTRACT

A method and apparatus for sustaining performance of a data storage device by predictively determining resource needs and executing processes to meet those needs before the resources are actually needed. According to certain embodiments, a controller collects commands coming from a host and provides these to a machine learning model such as a recurrent neural network (RNN). The RNN is trained using this data, and output of the trained model is used to predict future commands. As future commands are developed by the RNN, resource allocation processes such as garbage collection may be initiated prior to the actual need, during times when processing cycles in the data storage device are available. By operating the garbage collection when the device has available processing may mitigate transition to an urgent mode.

17 Claims, 9 Drawing Sheets

(56) References Cited

U.S. PATENT DOCUMENTS

| | | | |
|---|---|---|---|
| 9,734,911 B2* | 8/2017 | Sinclair | G06F 3/0658 |
| 9,778,855 B2* | 10/2017 | Sinclair | G06F 3/064 |
| 9,778,877 B1* | 10/2017 | Ware | G06F 13/4256 |
| 10,108,543 B1* | 10/2018 | Duggal | G06F 11/1453 |
| 10,108,544 B1* | 10/2018 | Duggal | G06F 11/14 |
| 10,120,613 B2* | 11/2018 | Sinclair | G06F 12/02 |
| 10,133,490 B2* | 11/2018 | Sinclair | G06F 3/0655 |
| 10,223,007 B1* | 3/2019 | Natanzon | G06F 3/065 |
| 10,430,279 B1* | 10/2019 | Dittia | G06F 3/0656 |
| 10,795,812 B1* | 10/2020 | Duggal | G06F 3/067 |
| 10,983,715 B2* | 4/2021 | Sharoni | G06Q 20/322 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0189477 A1* | 8/2008 | Asano | G06F 12/0246 |
| | | | 711/E12.008 |
| 2011/0145473 A1* | 6/2011 | Maheshwari | G06F 12/0873 |
| | | | 711/E12.008 |
| 2011/0161784 A1* | 6/2011 | Selinger | G06F 11/1016 |
| | | | 714/E11.002 |
| 2011/0302358 A1* | 12/2011 | Yu | G06F 11/108 |
| | | | 711/E12.008 |
| 2012/0173792 A1 | 7/2012 | Lassa et al. | |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2015/0193170 A1* | 7/2015 | Sundaram | G06F 3/067 |
| | | | 711/103 |
| 2015/0227602 A1* | 8/2015 | Ram | G06F 11/1456 |
| | | | 707/634 |
| 2016/0077745 A1* | 3/2016 | Patel | G06F 12/0246 |
| | | | 714/704 |
| 2016/0077746 A1* | 3/2016 | Muth | G06F 3/0644 |
| | | | 711/159 |
| 2016/0231948 A1* | 8/2016 | Gupta | G06F 3/0688 |
| 2016/0246713 A1* | 8/2016 | Choi | G06F 3/0608 |
| 2017/0123655 A1* | 5/2017 | Sinclair | G06F 3/061 |
| 2017/0255556 A1* | 9/2017 | Peng | G06F 12/126 |
| 2018/0276116 A1* | 9/2018 | Hahn | G06F 3/0659 |
| 2019/0057302 A1 | 2/2019 | Cho et al. | |
| 2019/0317901 A1 | 10/2019 | Kachare et al. | |
| 2020/0089420 A1* | 3/2020 | Sharoni | G06F 3/0637 |
| 2020/0310686 A1* | 10/2020 | Truong | G06F 3/067 |
| 2020/0409594 A1* | 12/2020 | Devriendt | G06F 3/0604 |
| 2021/0200448 A1* | 7/2021 | Chen | G06F 3/061 |

\* cited by examiner

DATA STORAGE DEVICE HAVING PREDICTIVE ANALYTICS

BACKGROUND OF THE DISCLOSURE

Field of the Disclosure

Embodiments of the present disclosure generally relate to a resource allocation in a data storage device, and more particularly to predictive resource allocation in a data storage device.

Description of the Related Art

Data storage devices such as solid state drives are developed to meet ever-increasing performance demands. Although performance developments continue to drive demand for these products, background processes continue to be a performance bottleneck.

When a data storage device executes large numbers of background processes, performance is impacted, and may be forced into urgent mode during which selected foreground and background processing is suspended while more urgent processes are allowed to continue. Background operations conventionally are triggered in an on-demand fashion. When a resource threshold such as available blocks for an operation, is reached a background process such as a garbage collection may be initiated to make more blocks available. Because garbage collection is executed when there is an immediate and actual need, if this process is suspended, the downstream effects will impact performance, and alternatively, the immediate need for this process may cause other processes to be suspended.

Therefore, there is a need in the art for an improved triggering of a background operation.

SUMMARY OF THE DISCLOSURE

The present disclosure generally relates to sustaining performance of a data storage device by predictively determining resource needs and executing processes to meet those needs before the resources are actually needed. According to certain embodiments, a controller collects commands coming from a host and provides these to a machine learning model such as a recurrent neural network (RNN). The RNN is trained using this data, and output of the trained model is used to predict future commands. As future commands are developed by the RNN, resource allocation processes such as garbage collection may be initiated prior to the actual need, during times when processing cycles in the data storage device are available. By operating the garbage collection when the device has available processing may mitigate transition to an urgent mode.

In one embodiment, a controller for a data storage device is disclosed, that includes a memory device comprising computer-readable instructions, a processor configured to read the computer-readable instructions. The computer-readable instructions cause the controller to receive a plurality of commands from a device coupled to the data storage device, train a machine learning model based on the plurality of commands and generate, with the machine learning model, a plurality of predicted commands of the device.

In another embodiment, a data storage device is disclosed that includes a controller configured to perform a method for command prediction. The method includes receiving a plurality of front-end command sequences from a host, generate a plurality of symbols by mapping each of the plurality of front-end command sequences to a symbol representing a backend command, analyzing the plurality of symbols to predict a future symbol that represents a front-end command sequence of the host, and allocate resources of the data storage device responsive to on the future symbol.

In another embodiment, a data storage device is disclosed that includes a memory means and a controller means coupled to the memory means. The controller means is configured to receive a plurality of command sequences, at least one of the plurality of command sequences comprising a write command, predict with a machine learning means a future write command, and execute a process to make space on the memory means available for the future write command.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure.

Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates generally to sustaining performance of a data storage device by predictively determining resource needs and executing processes to meet those needs before the resources are actually needed. According to certain embodiments, a controller collects commands coming from a host and provides these to a machine learning model such as a recurrent neural network (RNN). The RNN is trained using this data, and output of the trained model is used to predict future commands. As future commands are developed by the RNN, resource allocation processes such as garbage collection may be initiated prior to the actual need, during times when processing cycles in the data storage device are available. By operating the garbage collection when the device has available processing may mitigate transition to an urgent mode.

Figure 1:
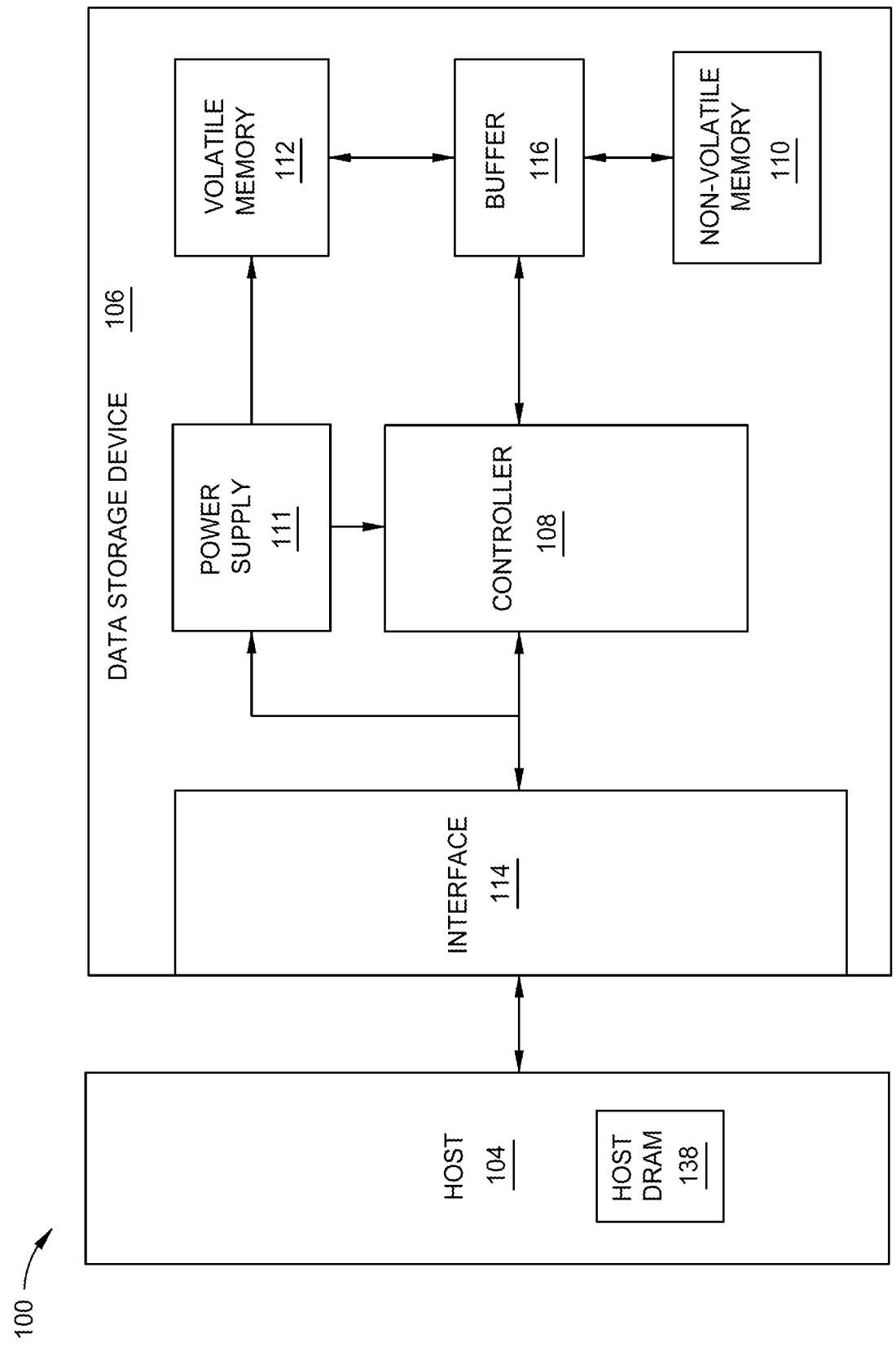
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

The interface 114 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an on-board backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, the controller 108 may use volatile memory 112 as a cache. For instance, the controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The controller 108 may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Furthermore, the controller 108 may include one or more processors configured to read computer-readable instructions. The controller 108 may execute commands based on the computer-readable instructions.

Figure 2:
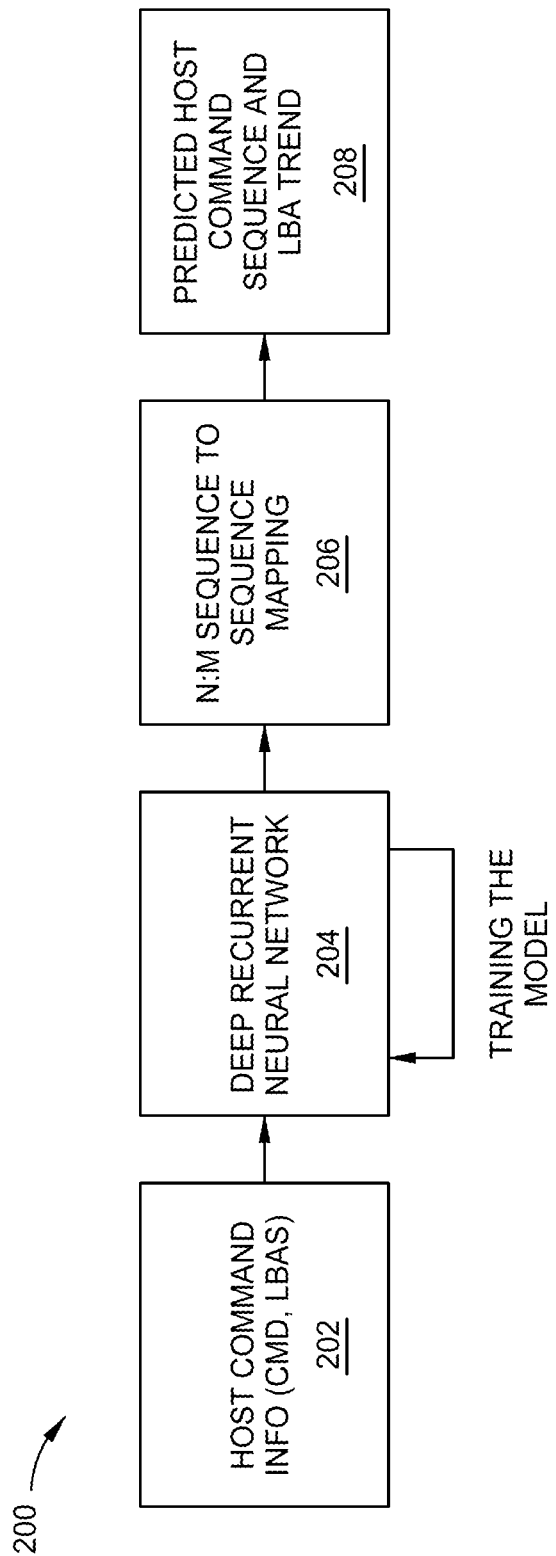
FIG. 2 is a schematic flow diagram illustrating a method for using recurrent neural network (RNN) model to predict host command sequences, according to certain embodiments.

FIG. 2 is a schematic flow diagram 200 illustrating a method for using a deep recurrent neural network (RNN) model 204 (herein referred to as RNN model 204 for simplification purposes) to predict host command sequences, according to certain embodiments. The RNN model 204 may be used in data management operations, such as garbage collection (GC). Furthermore, the RNN model 204 may be a machine learning (ML) model, which may be a form of artificial intelligence that enables a system, such as the data storage device 106 or the controller 108 of FIG. 1, to learn from received, calculated, and/or determined data. GC is a background operation that moves valid data from one block to another block, flag blocks containing invalid data as available, and other operations understood to be part of a GC process. In order for GC to be executed by a controller, such as the controller 108, certain thresholds need to be met. For example, when a valid fragments count (VFC) decreases below a threshold or a number of free MLC, or other cell types, blocks decreasing below a certain threshold.

When multiple GC operations are pending, the performance of the data storage device 106 may be decreased as one or more GC operations may cause the execution of host device, such as the host device 104 of FIG. 1, generated commands to be delayed. Because one or more GC operations may be pending, received host device generated commands may be delayed in order to execute the GC operations. Furthermore, GC operations may become an urgent operation if one or more thresholds are exceeded. For example, if a GC operation or multiple GC operations are pending for an extended period of time, errors may accumulate and/or available storage space (e.g., memory space) may be decreased due to random writes (i.e., non-sequential writes to the same memory device). Thus, the overall data storage device performance may be hindered, such as a lower available space for programming data in the memory device than the reported available space.

RNN models, such as the RNN model 204, may be used for sequential data analysis. The RNN models may have a property of being able to learn sequences and predict output sequences. Furthermore, RNN models may be utilized to generate an entire sequence based on an input sequence. When the host device 104 sends host command info 202 to the data storage device 106, the host command info 202 is received by the controller 108. The host command info 202 includes a host command, data of the host command, one or more LBAs corresponding to the host command, and the like. The host command info 202 is used to train the RNN model 204, where an iterative process occurs to train the RNN model 204. The host command info 202 utilizes a N:M sequence to sequence mapping 206, where the RNN model 204 outputs a predicted next host command sequence and LBA trend 208. In the N:M sequence to sequence mapping 206, "N" may represent the input sequence and "M" may represent the output sequence.

By using the RNN model 204, the predicted host command sequence and LBA trend 208 may predict the next set of commands, for example write commands, along with the corresponding LBAs. During data storage device 106 operation, the RNN model 204 may be used to analyze the write pattern and predict whether the host device 104 will send random or sequential writes in the depicted example. If it is predicted that the host device 104 is going to issue random writes, then the controller 108 may determine a number of random blocks (e.g., an available storage space) need to fulfill the predicted random writes. Furthermore, if the determined number of random blocks is greater than the number of spare random blocks, such as the number of blocks in a free block pool, or the determined number of random blocks causes the number of spare random blocks drops below GC threshold, the controller may generate a command to start garbage collection. Thus, by initiating a GC operation based on a predicted number of random blocks needed, GC operations may be triggered prior to requiring a GC operation to occur (e.g., an urgent GC operation).

Figure 3:
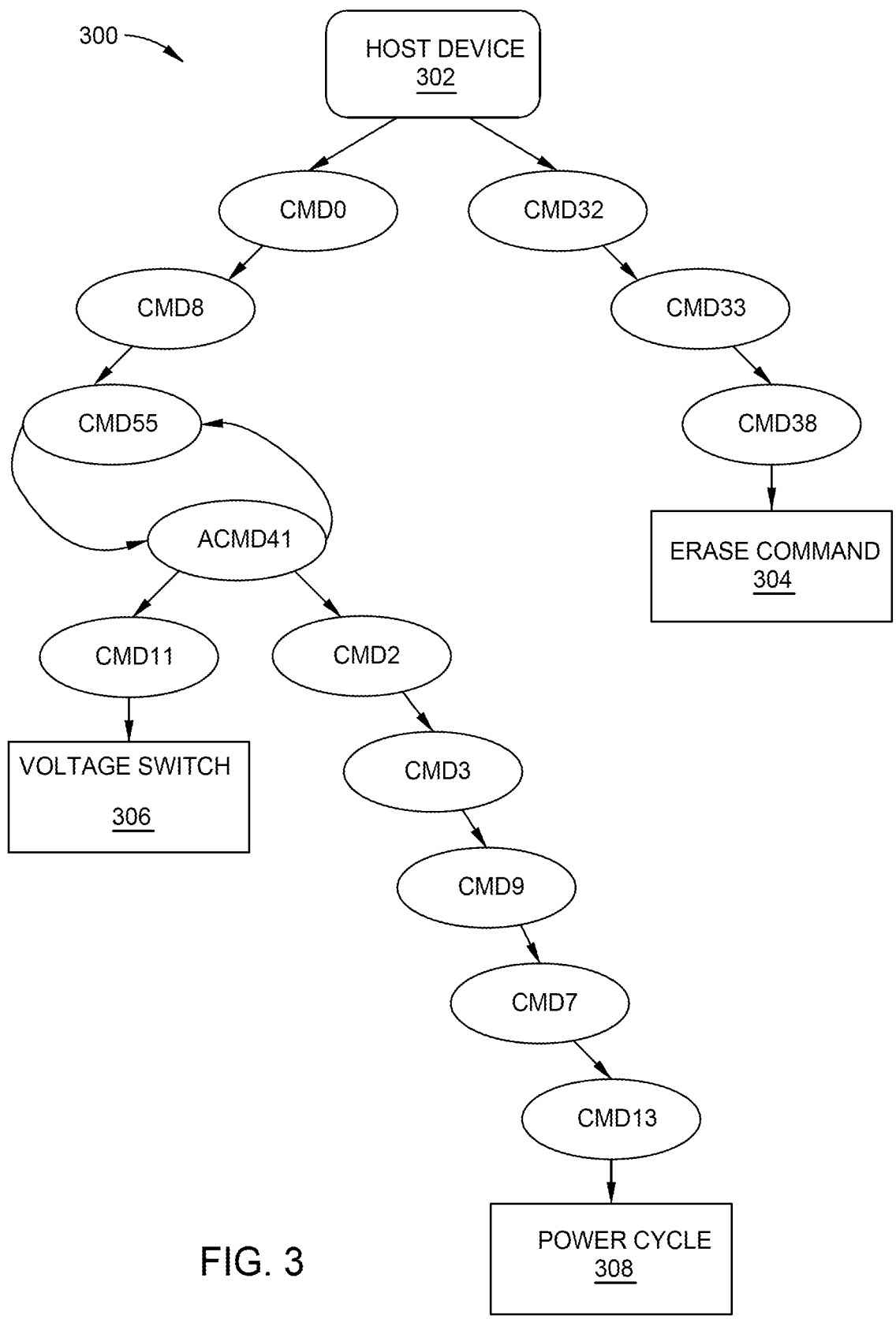
FIG. 3 is a schematic flow diagram illustrating a reduced host command sequence to text with a tree, according to certain embodiments.

FIG. 3 is a schematic flow diagram illustrating a reduced host command sequence to text with a tree 300, according to certain embodiments. A host device 302 may be the host device 104 of FIG. 1. The host device 302 sends one or more commands to a data storage device, such as the data storage device 106 of FIG. 1, where a controller, such as the controller 108, receives the host commands. The received host commands are represented by CMD# or ACMD#, where # represents a command number or a command ID. For example, CMD32 may refer to setting a start LBA. The host device 302 sends a sequence of front-end commands (e.g., CMD# or ACMD#) to fulfill an operation request. The standardization of front-end commands may allow for the reduction of the command sequences (e.g., a first CMD#, a second CMD#, etc.) to a textual format. Therefore, the tree 300 includes nodes representing each of the received commands and the sequence of the received commands represents a particular host command sequence.

For example, an erase command 304 may occur when the host device 302 issues the following commands in the following sequence: CMD32, CMD33, and CMD38. CMD32 sets the start LBA, CMD33 sets the end LBA, and CMD38 performs the erase between the start LBA and the end LBA. The tree 300 may include the commands, CMD32, CMD33, and CMD38, as internal nodes and the symbol "E" as the leaf node, where "E" refers to the erase command. Referring to the schematic flow diagram 200, when the host command info 202 is received by the controller 108, the sequence of commands in the host command info 202 may be compared to the tree 300. Thus, when a first command associated with CMD32 and a second command associated with CMD33 are received, the N:M sequence to sequence mapping 206 may output a predicted host command sequence and LBA trend 208 referring to the CMD38. It is contemplated that other trees and command sequences referring to different commands are applicable to the embodiments described herein.

Likewise, when a first command CMD0 is received and a second command CMD8 is received, then the predicted host command sequence and LBA trend 208 may refer to either a voltage switch command 306 or a power cycle command 308. In the previous example, in order to determine or predict whether the command sequence refers to a voltage switch command 306 or a power cycle command 308, a fifth command corresponding to either CMD2 or CMD11 will need to be received. When the fifth command corresponding to CMD2 is received, the predicted host command sequence and LBA trend 208 may predict that the command sequence will refer to the power cycle command 308. Else, if the fifth commands corresponds to CMD11 is received, then the predicted command may refer to the voltage switch command 306. Furthermore, the prediction of the command may also include a prediction or determination of the next number of commands, such as to determine a number of random blocks needed. For example, when the power cycle command 308 is predicted after the fifth command associated with CMD2 is received, the controller 108 may determine that 4 additional commands may be received. Thus, a prediction of the number of commands that will be sent by the host device 104 may be achieved by comparing the received commands to the tree 300, in one embodiment.

Referring to the tree 300, the sequence of nodes may be reduced to a textual format (e.g., a character). For example, assuming the host device 302 has sent the following commands in the following sequence: CMD0, CMD8, CMD55, ACMD41, CMD55, ACMD41, CMD2, CMD3, CMD9, CMD7, CMD13, CMD32, CMD33, CMD38, CMD24, CMD24, CMD24, CMD24, CMD24, CMD25, CMD25, etc. Therefore, the tree 300 may be traversed and the following commands are reduced to a sequence including: P, E, S, S, S, S, S, M, M, etc. Table 1 below represents the possible characters, in one embodiment, and their corresponding command.

TABLE 1

| Character | Command |
|---|---|
| P | Power Cycle |
| E | Erase |
| S | Single Sector Write |
| M | Multi Sector Write |
| R | Single Sector Read |
| ... | ... |

In the previous command sequence, "P" refers to the following commands: CMD0, CMD8, CMD55, ACMD41, CMD55, ACMD41, CMD2, CMD3, CMD9, CMD7, and CMD13. Likewise, the "E" symbol (following the "P" command) refers to the following commands: CMD32, CMD33, and CMD38. In one example, when determining the amount of random blocks needed for a write command, characters representing read commands may be replaced with a standardized character, such as "X." Therefore, the updated command sequence may represented as follows: X, X, S, S, S, S, S, M, M, etc. The LBAs corresponding to the updated command sequence are shown in Table 2 below.

TABLE 2

| Command | X | X | S | S | S | S | S | M | M | ... |
|---|---|---|---|---|---|---|---|---|---|---|
| Start LBA | — | — | 0 × 400 | 0 × 500 | 0 × 501 | 0 × 502 | 0 × 600 | 0 × 100 | 0 × 200 | |
| TransLen | — | — | 1 | 1 | 1 | 1 | 1 | 0 × 100 | 0 × 100 | |

The LBAs corresponding to the commands of the command sequences may be classified as either sequential or random. Random writes may represented by the symbol "A" and sequential writes may be represented by the symbol "B." Non-essential (e.g., read commands) are represented by the symbol "X." Therefore, the textual format may be reduced to the following reduced sequence: X, X, A, B, A, B, etc. Once the commands are determined to either be a sequential write or a random write, the LBAs of each (i.e., sequential write or random write) are maintained or tracked in a table. For example, Table 3 below depicts tracking the LBAs of the random writes of Table 2 and Table 4 below depicts tracking the LBAs of the sequential writes of Table 2.

TABLE 3

| Start LBA | TransLen (Transfer Length) |
|---|---|
| 0x400 | 0x1 |
| 0x600 | 0x1 |
| 0x4E2 | 0x60 |

TABLE 3-continued

| Start LBA | TransLen (Transfer Length) |
|---|---|
| 0x59A | 0x30 |
| ... | ... |

TABLE 4

| Start LBA | TransLen |
|---|---|
| 0x500 | 0x3 |
| 0x100 | 0x200 |
| 0x32C | 0x100 |
| ... | ... |

Figure 4:
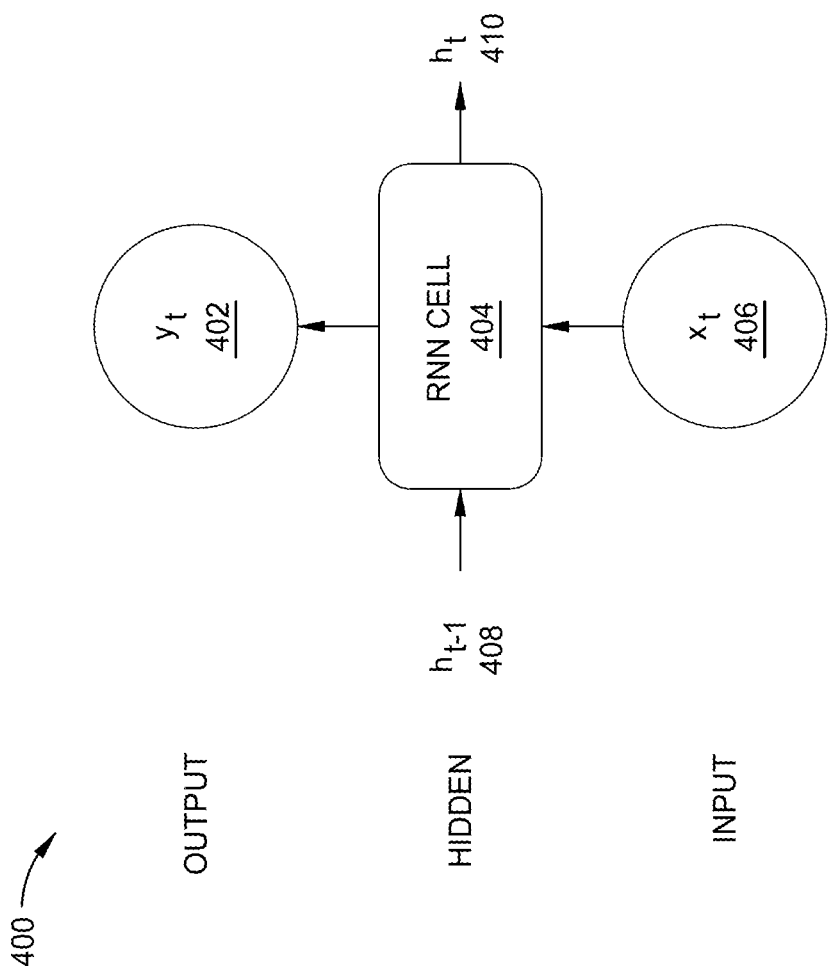
FIG. 4 is a schematic block diagram of a RNN cell architecture, according to certain embodiments.

FIG. 4 is a schematic block diagram of a RNN cell architecture 400, according to certain embodiments. The RNN cell architecture 400 may be a component of the RNN model 204 of FIG. 2. The RNN cell architecture 400 includes an output layer including an output node $y_t$ 402, a hidden layer including a RNN cell 404, an hidden input node $h_{t-1}$ 408, and a hidden output node $h_t$ 410, and an input layer including an input node $x_t$ 406. The hidden input node $h_{t-1}$ 408 is a previous RNN cell 404 output, such as the hidden output node $h_t$ 410. The hidden output node $h_t$ 410 is calculated based on the current input node $x_t$ 406 and the hidden input node $h_{t-1}$ 408. The input node $x_t$ 406 may be the encoded vectors representing the input character, such as X, A, or B from the above reduced sequence of FIG. 3 (i.e., X, X, A, B, A, B, etc.). The output node $y_t$ 402 may be the predicted host command, such as the predicted host command sequence and LBA trend 208 of FIG. 2. The RNN cell 404 may be able to predict command sequences due to the previously received inputs. The RNN cell architecture 400 may be a component of a machine learning model, such as an RNN, according to disclosed embodiments.

Figure 5:
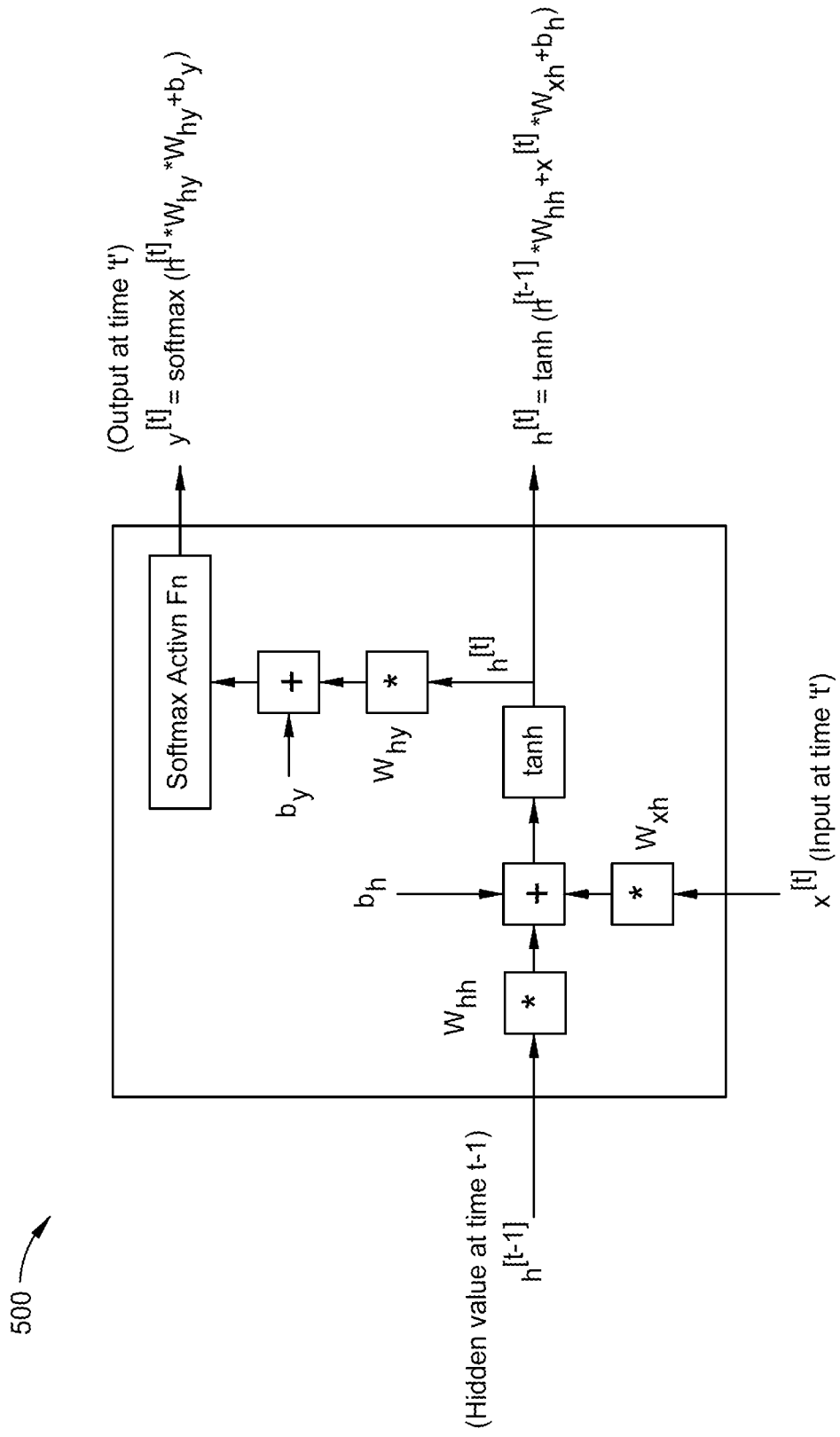
FIG. 5 is a schematic block diagram of an internal structure of a RNN cell, according to certain embodiments.

FIG. 5 is a schematic block diagram of an internal structure 500 of a RNN cell, such as the RNN cell 404 of FIG. 4, according to certain embodiments. Aspects of the RNN cell architecture 400 may be referenced herein for exemplary purposes. The internal structure 500 may represent an algorithm or logic that the RNN cell 404 may utilize. The algorithm includes a neural network and a recurrent neural network. The internal structure 500 includes the following parameters: $w_{xh}$, $w_{hh}$, $w_{hy}$, $b_h$, and $b_y$. $w_{xh}$ refers to the weights between the input, such as the input node $x_t$ 406, and the hidden layer. $w_{hh}$ refers to the weights between the previous hidden layer and the current hidden layer. $w_{hy}$ refers to the weights between the hidden layer and the output layer. $b_h$ refers to the bias to calculate $h^{[t]}$ at time-step t and $b_y$ refers to the bias to calculate $y^{[y]}$ at time-step t. Based on the internal structure 500, the values of the hidden layer, such as the hidden output node $h_t$ 410, and the output layer, such as the output node $y_t$ 402, may be calculated using the following equations:

$$h^{[t]} = \tan h(h^{[t-1]} * w_{hh} + x^{[t]} * w_{xh} + b_h)$$

$$y^{[t]} = h^{[t]} * w_{hy} + b_y$$

Furthermore, the probabilities of the output characters may be calculated using a softmax activation function. The probabilities may be calculated using the following equation:

$$y^{[t]} = \text{softmax}(y^{[t]})$$

The input $x^{[t]}$ is the provided text with the characters {X, A, B}. The training pattern of the network may include up to or more than 100 time steps of one symbol followed by one output character. In other words, based on the previous 100 characters, the model may the next symbol in the sequence. When the predicted symbol is a write, a transfer length corresponding to the predicted symbol is predicted. The RNN model 204 may be used again to perform N:M sequence mapping, which may be the N:M sequence to sequence mapping 206 of FIG. 2, to predict the next set of transfer lengths based on the previous transfer lengths issued by the host in order to calculate the number of blocks that would be required to fulfill the upcoming writes in advance. Seq2Seq models are used to predict the 'M' element sequence when the 'N' element sequence is provided as an input. Seq2Seq models are a method of encoder-decoder based machine translation and language processing that maps an input of sequence to an output of sequence with a tag and attention value. Thus, the Seq2Seq models are used to predict the next sequence from the previous sequence.

Figure 6:
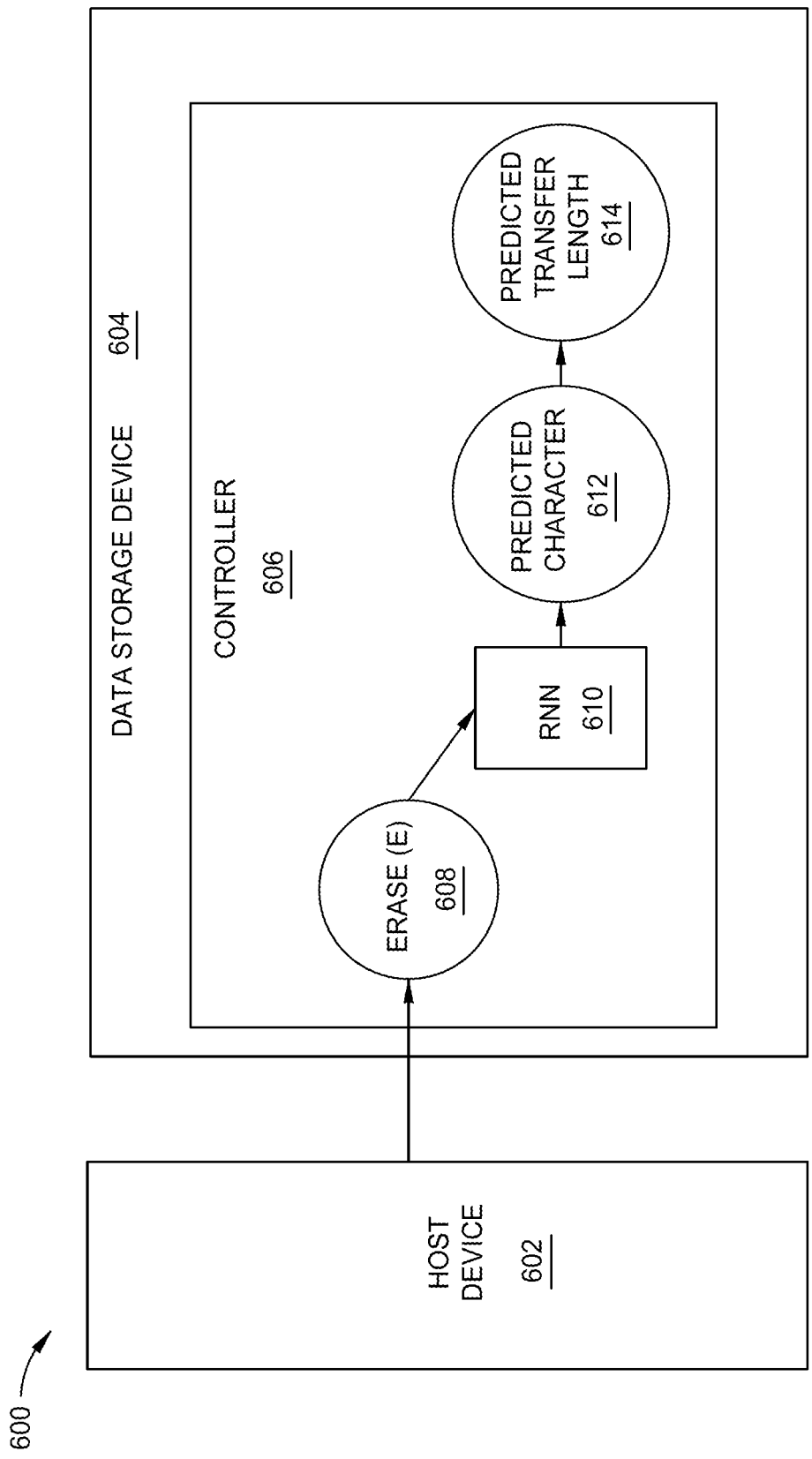
FIG. 6 is a schematic block diagram of a storage system utilizing a RNN model, according to certain embodiments.

FIG. 6 is a schematic block diagram of a storage system 600 utilizing a RNN model 610, according to certain embodiments. A host device 602 sends commands to a data storage device 604, where the commands are received by a controller 606. For example, the commands received may be received in the order of a first command corresponding to CMD32, a second command corresponding to CMD33, and a third command corresponding to CMD38. Based on the received sequence and comparing the received sequence to a tree, such as the tree 300 of FIG. 3, the corresponding command results in an erase command 608. It is to be understood that the erase command 608 is an exemplary embodiment and other command sequences and commands are applicable to the described embodiments.

Furthermore, when the erase command 608 is outputted, the command sequence is reduced to a symbol "E" in the depicted example. The "E" is provided to a RNN model 610, which may be the RNN model 204 of FIG. 2. The RNN model 610 may be a tinyML model, where tinyML refers to a field of study in machine learning and embedded systems that explores types of models that may run or operate on small, low-powered devices, such as microcontrollers. The RNN model 610 outputs a predicted symbol 612 and a predicted transfer length 614.

Figure 7:
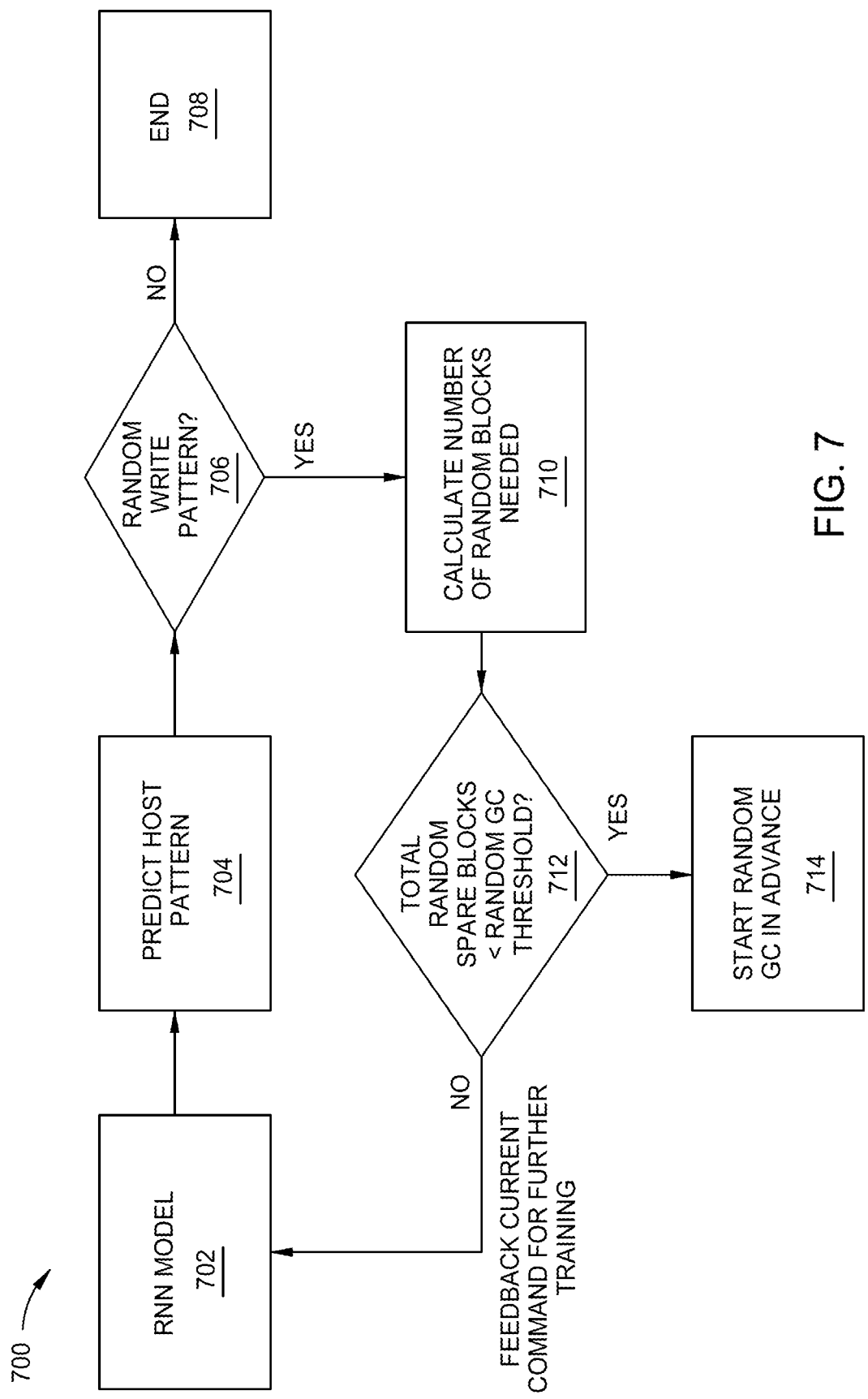
FIG. 7 is a schematic flow diagram illustrating a method of predicting random garbage collection in advance, according to certain embodiments.

FIG. 7 is a schematic flow diagram illustrating a method 700 of predicting garbage collection in advance, according to certain embodiments. Method 700 may be executed or implemented by a controller, such as the controller 606 of FIG. 6. At block 702, the RNN model, which may be the RNN model 204 of FIG. 2, receives input sequences and predicts a host pattern at block 704 based on the input sequences. If the host pattern is a write pattern, then method 700 continues to block 706. At block 706, the controller 606 determines if the write pattern is a random write pattern or a sequential write pattern. If the write pattern is a sequential write pattern at block 706, then method 700 ends at block 708. However, if the write pattern is a random write pattern at block 706, then the controller 606 calculates the number of random blocks needed at block 710. The calculation may be completed by a RNN cell, such as the RNN cell 404 of FIG. 4.

At block 712, the controller 606 determines if the total random spare blocks is less than the random GC threshold. If the total random spare blocks is less than the random GC threshold at block 712, then the controller 606 starts a random GC in advance at block 714 to free up blocks for the random spare block pool. However, if the total random spare blocks is greater than the random GC threshold at block 712, then method 700 returns to block 702 where the predictions and the calculations are provided to the RNN model 204 at block 702 for further RNN model training.

Figure 8:
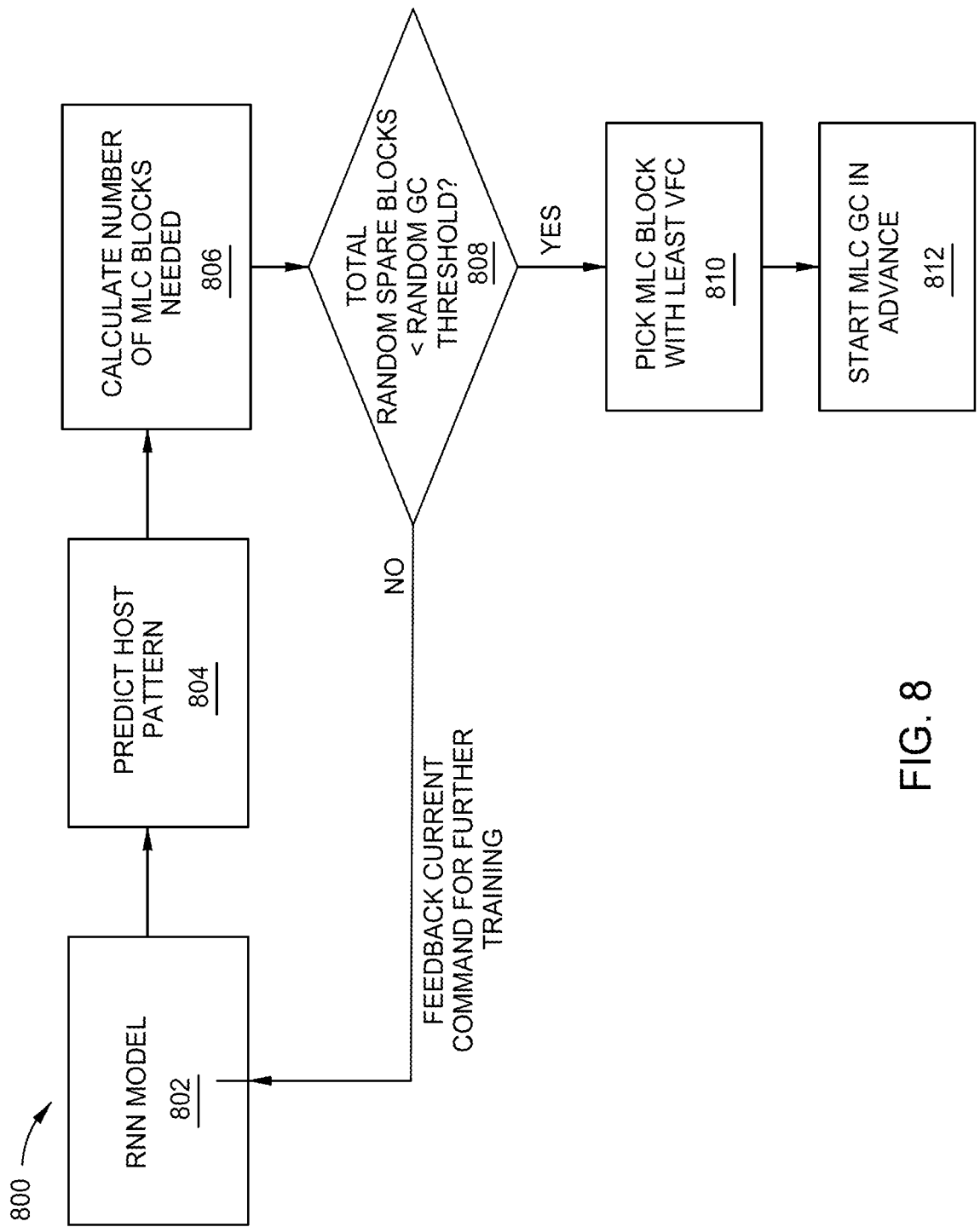
FIG. 8 is a schematic flow diagram illustrating a method of predicting multi-level cell (MLC) block garbage collection in advance, according to certain embodiments.

FIG. 8 is a schematic flow diagram illustrating a method 800 of predicting multi-level cell (MLC) block garbage collection in advance, according to certain embodiments. It is to be understood that the embodiments herein are not limited to MLC block GC, but may be applicable to other memory cell densities, such as SLC, TLC, QLC, and the like. Method 800 may be executed or implemented by a controller, such as the controller 606 of FIG. 6. At block 802, the RNN model, such as the RNN model 204 of FIG. 2, receives an input sequence and outputs a predicted host pattern at block 804. At block 806, the controller 606 calculates the number of MLC blocks needed for the predicted host pattern at block 804. In some examples, the RNN model 204 may output a calculated number of MLC blocks needed for the predicted host pattern at block 804.

At block 808, the controller determines if the total MLC spare blocks is less than a MLC GC threshold. If the total MLC spare blocks is less than a MLC GC threshold at block 808, then one or more MLC blocks with the least VFC is picked at block 810. At block 812, the MLC GC is started on the picked one or more MLC blocks. However, if the total MLC spare blocks is not less than the MLC GC threshold at block 808, then the predicted host pattern and the calculated number of MLC blocks is provided back to the RNN model 204 at block 802.

Figure 9:
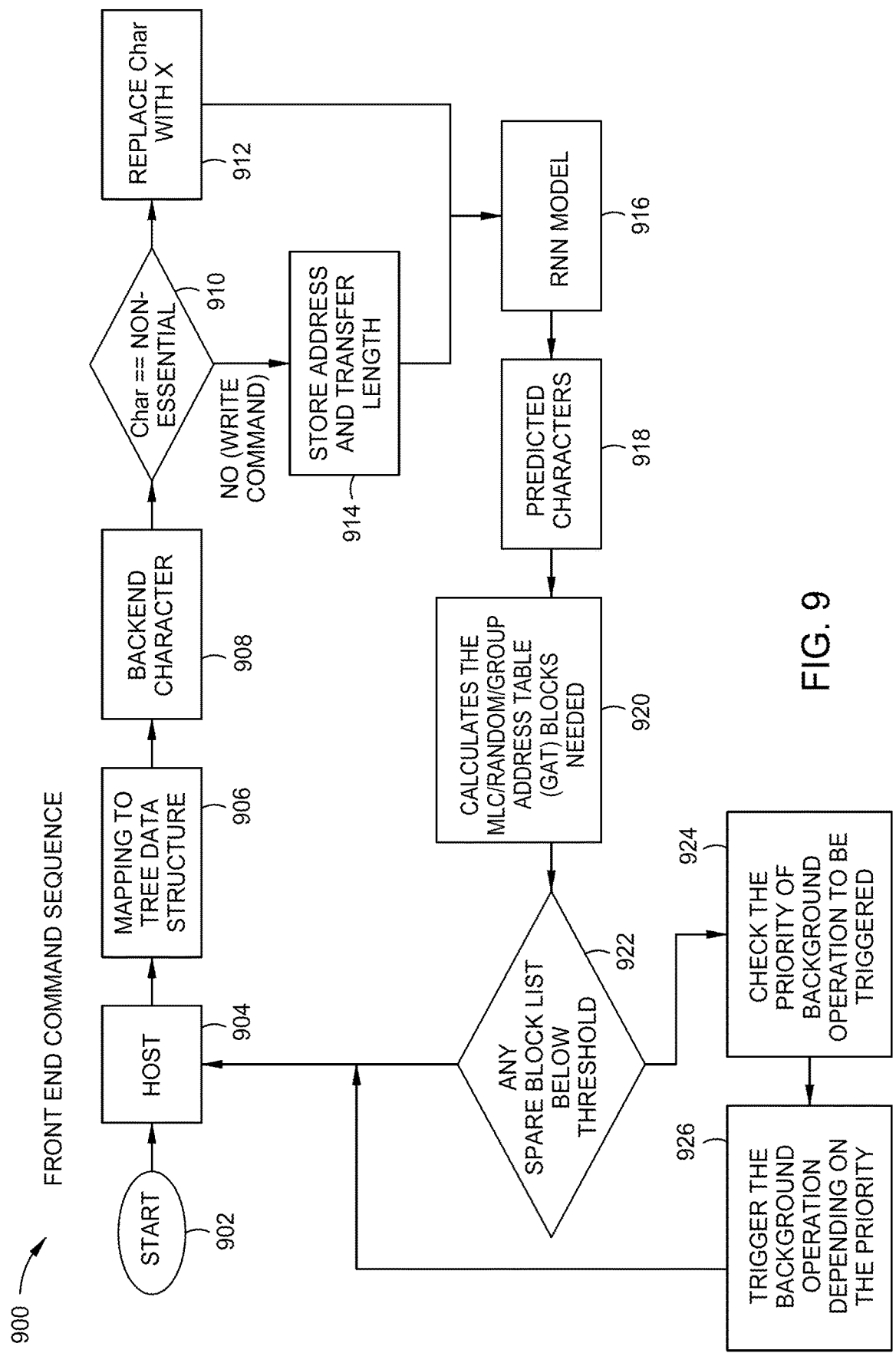
FIG. 9 is a schematic flow diagram illustrating a method of predicting background operations, according to certain embodiments.

FIG. 9 is a schematic flow diagram illustrating a method 900 of predicting background operations, according to certain embodiments. Method 900 may be executed or implemented by a controller, such as the controller 606 of FIG. 6. At block 902, method 900 begins. At block 904, a host, such as the host device 104 of FIG. 1, sends one or more commands to a data storage device, such as the data storage device 106 of FIG. 1. The one or more commands are received by a controller, such as the controller 108 of FIG. 1, where the one or more commands are mapped to a tree data structure, such as the tree 300 of FIG. 3, at block 906.

After mapping the one or more commands to the tree 300 at block 906, a backend symbol or character (e.g., P, E, S, M, R, etc.) is output at block 908. At block 910, the controller 108 determines if the backend symbol is a non-essential character. A non-essential symbol or character may refer to a symbol that is not related to a write command. If the symbol is non-essential at block 910, then the non-essential symbol is replaced at block 912 with "X," which refers to a command other than a write command. However, if the symbol is not a non-essential symbol at block 910, then the address and transfer length of the command (e.g., the LBAs) are stored at block 914.

At block 916, the one or more characters are sent to the RNN model, such as the RNN model 204 of FIG. 2. The RNN model 204, based on the inputs and the previous hidden layers, outputs predicted characters at block 918. At block 920, the controller 108 or the RNN model 204 calculates the MLC/random/group address table (GAT) blocks needed. At block 922, the controller 108 determines if there are any spare blocks lists (or random block lists) (e.g., free block pool) below a threshold, such as a GC threshold. If there are no spare block lists below the threshold at block 922, then method 900 returns to waiting to receive a host command at block 904. However, if there are any spare block lists below the threshold at block 922, then the controller 108 checks the priority of the background operation to be triggered at block 924. The background operation may include a GC operation. Furthermore, GC operations may have various priority levels based on different factors, such as a time elapsed since the last GC operation, a number of blocks remaining, and the like. At block 926, the controller 108 triggers the background operation depending on the priority.

By determining to execute a garbage collection operation based on a predicted number of commands to be received, the firmware overhead may be reduced and the sustained performance of the data storage device may be improved.

In one embodiment, a controller for a data storage device is disclosed, that includes a memory device comprising computer-readable instructions, a processor configured to read the computer-readable instructions. The computer-readable instructions cause the controller to receive a plurality of commands from a device coupled to the data storage device, train a machine learning model based on the plurality of commands and generate, with the machine learning model, a plurality of predicted commands of the device.

The processor further configured to cause the controller to initiate a garbage collection (GC) process when a number of blocks required by the plurality of predicted commands is below a threshold of available blocks. The machine learning model comprises one of a neural network or a recurrent neural network. The plurality of predicted commands comprise a random write pattern. The GC process is given a priority to execute prior to a time when the plurality of predicted commands are determined to be received by the controller. The blocks are multi-level cell (MLC) blocks. The processor is further configured to cause the controller to receive logical block addresses (LBAs) and transfer lengths associated with the received commands, and train the machine learning model base on the LBAs and transfer lengths.

In another embodiment, a data storage device is disclosed that includes a controller configured to perform a method for command prediction. The method includes receiving a plurality of front-end command sequences from a host, generate a plurality of symbols by mapping each of the plurality of front-end command sequences to a symbol representing a backend command, analyzing the plurality of symbols to predict a future symbol that represents a front-end command sequence of the host, and allocate resources of the data storage device responsive to on the future symbol.

Each symbol of the plurality of symbols is aggregated to a symbol sequence. The analyzing includes providing the symbol sequence to a machine learning algorithm. The machine learning algorithm includes one of a neural network and a recurrent neural network. A portion of the plurality of symbols are comprised of write-symbols representing write back-end commands. A transfer length is associated with each of the write-symbols. The method further includes analyzing the transfer length associated with each of the write symbols with a machine learning algorithm to predict a future transfer length associated with a future symbol. The machine learning algorithm comprises one of a neural network and a recurrent neural network.

In another embodiment, a data storage device is disclosed that includes a memory means and a controller means coupled to the memory means. The controller means is configured to receive a plurality of command sequences, at least one of the plurality of command sequences comprising a write command, predict with a machine learning means a future write command, and execute a process to make space on the memory means available for the future write command.

The controller is further configured to map each of the plurality of command sequences to a symbol, provide each symbol to the machine learning means, receive a predictive symbol from the machine learning means, and map the predictive symbol to the future write command. The controller is further configured to receive a transfer length associated with the write command, provide the transfer length to a second machine learning means, and receive from the second machine learning means a predicted future transfer length of the future write command. The controller is further configured to classify the write command as a random write command or a sequential write command based on at least two logical block addresses (LBAs) associated with the write command.

While the foregoing is directed to embodiments of the present disclosure, other and further embodiments of the disclosure may be devised without departing from the basic scope thereof, and the scope thereof is determined by the claims that follow.

What is claimed is:

1. A controller for a data storage device, comprising:
a memory device comprising computer-readable instructions; and
a processor configured to read the computer-readable instructions that cause the controller to:
receive a plurality of commands;
train a machine learning model based on the plurality of commands, wherein the machine learning model includes a recurrent neural network (RNN) cell architecture that utilizes an algorithm that includes $w_{xh}$, $w_{hh}$, $w_{hy}$, $b_h$, and $b_y$, wherein $w_{xh}$ is a weight between an input and a hidden layer, wherein $w_{hh}$ is a weight between a previous hidden layer and a current hidden layer, wherein $w_{hy}$ is a weight between a hidden layer and an output layer, wherein $b_h$ is a bias to calculate $h^{[t]}$ at time-step t and $b_y$ is a bias to calculate $y^{[y]}$ at time-step t, wherein:

$h^{[t]} = \tan h(h^{[t-1]} * w_{hh} + x^{[t]} * w_{xh} + b_h)$, $y^{[t]} = h^{[t]} * w_{hy} + b_y$, and $y^{[t]} = \text{softmax}(y^{[t]})$; and generate, with the machine learning model, a plurality of predicted commands of a host device.

2. The controller of claim 1, the processor further configured to cause the controller to initiate a garbage collection (GC) process when a number of blocks of the memory device required by the plurality of predicted commands is below a threshold of available blocks of the memory device.

3. The controller of claim 2, wherein the plurality of predicted commands comprise a random write pattern.

4. The controller of claim 3, wherein the GC process is given a priority to execute before the plurality of predicted commands are received by the controller.

5. The controller of claim 3, wherein the processor is further configured to cause the controller to receive logical block addresses (LBAs) and transfer lengths associated with the received commands, and train the machine learning model based on the LBAs and transfer lengths.

6. The controller of claim 2, wherein the blocks are multi-level cell (MLC) blocks.

7. A data storage device, comprising:
a controller configured to perform a method for command prediction, the method comprising:
receiving a plurality of front-end command sequences from a host;
generate a plurality of symbols by mapping each of the plurality of front-end command sequences to a symbol representing a backend command, wherein generating a plurality of symbols utilizes a machine learning model that includes a recurrent neural network (RNN) cell architecture that utilizes an algorithm that includes $w_{xh}$, $w_{hh}$, $w_{hy}$, $b_h$, and $b_y$, wherein $w_{xh}$ is a weight between an input and a hidden layer, wherein $w_{hh}$ is a weight between a previous hidden layer and a current hidden layer, wherein $w_{hy}$ is a weight between a hidden layer and an output layer, wherein $b_h$ is a bias to calculate $h^{[t]}$ at time-step t and $b_y$ is a bias to calculate $y^{[y]}$ at time-step t, wherein:

$h^{[t]} = \tan h(h^{[t-1]} * w_{hh} + x^{[t]} * w_{xh} + b_h)$, $y^{[t]} = h^{[t]} * w_{hy} + b_y$, and $y^{[t]} = \text{softmax}(y^{[t]})$;

analyzing the plurality of symbols to predict a future symbol that represents a front-end command sequence of the host; and
allocate resources of the data storage device responsive to the future symbol.

8. The data storage device of claim 7, wherein each symbol of the plurality of symbols is aggregated to a symbol sequence.

9. The data storage device of claim 8, wherein the analyzing comprises providing the symbol sequence to a machine learning algorithm.

10. The data storage device of claim 7, wherein a portion of the plurality of symbols are comprised of write-symbols representing write back-end commands.

11. The data storage device of claim 10, wherein a transfer length is associated with each of the write-symbols.

12. The data storage device of claim 11, wherein the method further comprises analyzing the transfer length associated with each of the write-symbols with a machine learning algorithm to predict a future transfer length associated with a future symbol.

13. A data storage device comprising:
a memory means;
a controller coupled to the memory means, configured to:
receive a plurality of command sequences, at least one of the plurality of command sequences comprising a write command;
predict with a machine learning model a future write command, wherein the machine learning model includes a recurrent neural network (RNN) cell architecture that utilizes an algorithm that includes $w_{xh}$, $w_{hh}$, $w_{hy}$, $b_h$, and $b_y$, wherein $w_{xh}$ is a weight between an input and a hidden layer, wherein $w_{hh}$ is a weight between a previous hidden layer and a current hidden layer, wherein $w_{hy}$ is a weight between a hidden layer and an output layer, wherein $b_h$ is a bias to calculate $h^{[t]}$ at time-step t and $b_y$ is a bias to calculate $y^{[y]}$ at time-step t, wherein:

$h^{[t]} = \tan h(h^{[t-1]} * w_{hh} + x^{[t]} * w_{xh} + b_h)$, $y^{[t]} = h^{[t]} * w_{hy} + b_y$, and $y^{[t]} = \text{softmax}(y^{[t]})$; and execute a process to make space on the memory means available for the future write command.

14. The data storage device of claim 13, the controller further configured to:
map each of the plurality of command sequences to a symbol;
provide each symbol to the machine learning model;

receive a predictive symbol from the machine learning model; and map the predictive symbol to the future write command.

15. The data storage device of claim 14, the controller further configured to:

receive a transfer length associated with the write command;

provide the transfer length; and receive a predicted future transfer length of the future write command.

16. The data storage device of claim 15, the controller further configured to:

classify the write command as a random write command or a sequential write command based on at least two logical block addresses (LBAs) associated with the write command.

17. The data storage device of claim 16, the controller further configured to:

classify the future write command responsive to the classifying of the write command.

* * * * *